US011667792B2

(12) United States Patent
Zafar et al.

(10) Patent No.: US 11,667,792 B2
(45) Date of Patent: Jun. 6, 2023

(54) PROCESS FOR PREPARING A SOLUTION OF LIGNIN IN AN AQUEOUS MEDIUM

(71) Applicant: Stora Enso OYJ, Helsinki (FI)

(72) Inventors: Ashar Zafar, Alta (SE); Jesper Ekström, Johanneshov (SE)

(73) Assignee: Stora Enso OYJ, Helsinki (FI)

( * ) Notice: Subject to any disclaimer, the term of this patent is extended or adjusted under 35 U.S.C. 154(b) by 464 days.

(21) Appl. No.: 16/613,738

(22) PCT Filed: May 22, 2018

(86) PCT No.: PCT/IB2018/053597
§ 371 (c)(1),
(2) Date: Nov. 14, 2019

(87) PCT Pub. No.: WO2018/215922
PCT Pub. Date: Nov. 29, 2018

(65) Prior Publication Data
US 2020/0079960 A1 Mar. 12, 2020

(30) Foreign Application Priority Data
May 23, 2017 (SE) .................... 1750643-7

(51) Int. Cl.
*C08L 97/00* (2006.01)
*B27N 1/02* (2006.01)
*C08G 8/38* (2006.01)

(52) U.S. Cl.
CPC .......... *C08L 97/005* (2013.01); *B27N 1/0209* (2013.01); *C08G 8/38* (2013.01)

(58) Field of Classification Search
CPC .................................................. C08L 97/005
See application file for complete search history.

(56) References Cited

U.S. PATENT DOCUMENTS

| 3,864,291 A | 2/1975 | Terje et al. |
| 4,113,675 A | 9/1978 | Clarke et al. |
| 5,866,642 A | 2/1999 | Mcvay et al. |

FOREIGN PATENT DOCUMENTS

| CN | 101348698 B | 1/2009 |
| CN | 102848443 A | 1/2013 |
| WO | 9424192 A1 | 10/1994 |
| WO | 2013144454 A1 | 10/2013 |

OTHER PUBLICATIONS

Li Hongqiang, South China University of Technology Press, "Principle, Technology and Application of Adhesives", Jan. 31, 2014.
Zhang Long et al., Huazhong University of Science and Technology Press, "Green Chemistry", May 31, 2008.
Chinese Office Action from corresponding Chinese application No. CN201880034369.0 dated May 19, 2021.
International Search Report for PCT/IB2018/053597, dated Mar. 18, 2018.
Lin-wu Zhao et al. "Utilization of Softwood Kraft Lignin as Adhesive for the Manufacture of Reconstituted Wood", Journal of Wood Chemistry and Technology, 14:1, 127-145.

*Primary Examiner* — Arrie L Reuther
(74) *Attorney, Agent, or Firm* — Greer, Burns & Crain, Ltd.

(57) ABSTRACT

The present invention relates to a process for lignin dissolution in which partial methylolation of lignin is carried out during the step of preparing a solution of lignin in an aqueous medium comprising alkali. The lignin prepared according to the process of the present invention can be used to manufacture lignin-based phenolic resins, which are particularly useful in the manufacture of laminates.

7 Claims, No Drawings

PROCESS FOR PREPARING A SOLUTION OF LIGNIN IN AN AQUEOUS MEDIUM

This application is a U.S. National Phase under 35 U.S.C. § 371 of International Application No. PCT/IB2018/053597, filed May 22, 2018, which claims priority under 35 U.S.C. §§ 119 and 365 to Swedish Application No. 1750643-7, filed May 23, 2017.

FIELD OF THE INVENTION

The present invention relates to a process for lignin dissolution in which partial methylolation of lignin is carried out during the step of preparing a solution of lignin in an aqueous medium comprising alkali.

The lignin prepared according to the process of the present invention can be used to manufacture lignin-based phenolic resins, which are particularly useful for example in the manufacture of laminates, plywood, laminated veneer lumber and oriented strand board.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of structural wood products such as plywood, oriented strand board and fiberboard. During synthesis of such adhesives, phenol, partially replaced by lignin, is reacted with formaldehyde in the presence of either basic or acidic catalyst to form a highly cross-linked aromatic resins termed novolacs (when utilizing acidic catalysts) or resoles (when utilizing basic catalysts). Currently, only limited amounts of the phenol can be replaced by lignin due to the lower reactivity of lignin.

Lignin may be utilized as a powder at the time that it is incorporated into the resin formulation. Lignin can also be utilized in "liquid form" in an alkali solution in order to avoid lignin dust. If the moisture content of the powder lignin is relatively low (0-5%), it can be dusty and may create respiratory hazards. If the moisture content of the solids is relatively high (8-50%), it can be sticky or clumpy and difficult to transfer in reliable and quantitative manner.

One problem when preparing resins comprising lignin is to ensure that the inherent reactivity of the lignin is fully utilized by adequately dissolving it in a suitable liquid medium.

U.S. Pat. No. 4,113,675 is directed to a highly cross-linkable methylolated kraft lignin resin for use as a high wet strength adhesive.

Malutan et al. (2008), BioResources 3(1), 13-20, is directed to hydroxymethylation of lignin and aims at determining reaction conditions to improve the reactivity of lignin by fully methylolating lignin.

There is a need to facilitate the process for preparing a solution of lignin in an aqueous medium, particularly for preparation of resins.

SUMMARY OF THE INVENTION

It has now surprisingly been found that the solubility of lignin can be increased by partial methylolation during the step of preparing a solution of lignin in an aqueous medium.

The present invention is thus directed to a method for dissolving lignin in an aqueous medium comprising the steps of
- a) mixing lignin, alkali and formaldehyde in an aqueous medium;
- b) mixing until a solution of lignin in the aqueous medium has been obtained;
- characterized in that the molar ratio between the formaldehyde and lignin monomer is 0.4 or less.

Preferably, the method for dissolving lignin in an aqueous medium comprises the steps of
- a) mixing lignin, alkali and formaldehyde in an aqueous medium;
- b) mixing until a solution of lignin in the aqueous medium has been obtained;
- characterized in that the molar ratio between the formaldehyde and lignin monomer is 0.2 or less.

More preferably, the method for dissolving lignin in an aqueous medium comprises the steps of
- a) mixing lignin, alkali and formaldehyde in an aqueous medium;
- b) mixing until a solution of lignin in the aqueous medium has been obtained;
- characterized in that the molar ratio between the formaldehyde and lignin monomer is 0.2 or less and in that the lignin has been isolated and/or purified before step a).

Most preferably, the lignin has been isolated from black liquor and optionally purified before step a).

The present invention is also directed to a method for preparing a resin, comprising the steps of
- a) mixing lignin, alkali and formaldehyde in an aqueous medium;
- b) mixing until a solution of lignin in the aqueous medium has been obtained;
- c) keeping the mixture obtained in step b) at a temperature in the range of from 30° C. to 95° C.; and
- d) adding additional formaldehyde and phenol and maintaining the mixture at a temperature of from 30° C. to 95° C. for at least 30 minutes;
- characterized in that the molar ratio between the formaldehyde and lignin monomer in step a) is 0.4 or less.

The present invention is thus also directed to resins and the use of said resins in the manufacture of laminates, plywood, oriented strand board (OSB), laminated veneer lumber (LVL), insulation and other engineered wood products. The present invention is also directed to such laminates and engineered wood products manufactured using said resins.

The present invention is also directed to a method for increasing the solubility of lignin in an aqueous medium comprising the steps of
- a) mixing lignin, alkali and formaldehyde in an aqueous medium;
- b) mixing until a solution of lignin in the aqueous medium has been obtained;
- characterized in that the molar ratio between the formaldehyde and lignin monomer is 0.4 or less.

DETAILED DESCRIPTION

It is intended throughout the present description that the expression "lignin" embraces any kind of lignin, e.g. lignin originated from hardwood, softwood or annular plants. Preferably the lignin is an alkaline lignin generated in e.g. the Kraft process. Preferably, the lignin has been purified or isolated before being used in the process according to the present invention. The lignin may be isolated from black liquor and optionally be further purified before being used in the process according to the present invention. The purification is typically such that the purity of the lignin is at least 90%, preferably at least 95%. Thus, the lignin used according to the method of the present invention preferably contains less than 10%, preferably less than 5% impurities. The lignin may be separated from the black liquor by using the process disclosed in WO2006031175.

In one embodiment of the invention, an amount of alkali is added to the aqueous medium so that the aqueous medium comprises 5-50 wt % alkali, such as 10-50 wt % alkali, such as 40-50 wt % alkali. In one embodiment of the present invention the pH of the aqueous medium is at least pH 8, such as at least pH 10, such as at least pH 12 or at least pH13.

The alkali is preferably sodium hydroxide, potassium hydroxide, calcium hydroxide, magnesium hydroxide or a mixture thereof.

In one embodiment of the present invention, the molar ratio between formaldehyde and lignin monomer in step a) is 0.4 or less, such as 0.35 or less or 0.30 or less or 0.25 or less or 0.20 or 0.15 or 0.10 or less. In one embodiment of the present invention the ratio between formaldehyde and lignin in step a) is at least 0.01, such as at least 0.02 or at least 0.05. The molar ratio between formaldehyde and lignin is calculated based on an average lignin monomer molecular weight of 190 g/mol. The molecular mass of the phenylpropane unit (C9) in lignin was considered to be 190 g/mol. The duration of step c) of the process described above is typically at least 5 minutes, such as at least 15 minutes or at least 30 minutes. The temperature used in step c) is in the range of 30-95° C., such as 40-80° C.

The mixing of lignin, alkali and formaldehyde in step a) can be carried out in any order. Each component may for example be added consecutively or at the same time as one or two of the other components. In one embodiment, the components are added in such a way that a part of the total amount of each component is added and one or more additional amounts of each component is subsequently added.

It is preferred that the solution in step b) comprises 5-50 wt %, such as 5-40 wt % lignin.

In one embodiment of the present invention, the mixing in step b) is carried out at room temperature, such as at a temperature of from 15° C. to 25° C. In one embodiment of the present invention, the mixing in step b) is carried out at elevated temperature, such as from 25° C. to 95° C., such as from 50° C. to 95° C.

The present invention also relates to a resin composition. The resin composition is preferably a lignin-phenol-formaldehyde resin. Said resin composition can be prepared by adding phenol and additional formaldehyde to the solution described above and heating said mixture. The temperature at the time of adding phenol and additional formaldehyde is typically in the range of from 40° C. to 60° C., such as about 50° C. Typically, the amount of phenol added is approximately the same as the amount of lignin, but it is appreciated that more or less phenol can be added depending on what type of resin composition is desired. The heating described in step d) is typically carried out at a temperature of 70-85° C. for at least 30 minutes and typically for 4-8 hours. Typically, the viscosity increases during the heating in step d).

The resin obtained is useful for example in the manufacture of laminates. The resin is then impregnated into and/or applied between the sheets that should form the laminate and said sheets are pressed together and heated at a temperature of about 130-150° C.

There are a number of advantages of the process described above, including:
  increased solubility of lignin in the aqueous medium
  shorter gel time of a resin obtained using lignin that has been subjected to the process according to the present invention.

The present invention also relates to the use of the resin composition in engineered wood products such as plywood, particle board, wafer board, gluelam beams, structural composite lumber, oriented strand board (OSB), oriented strand lumber (OSL), laminated veneer lumber (LVL) and other applications such as laminates, insulation and molding compounds.

EXAMPLES

Example 1

Lignin based phenolic resin was synthesized for plywood applications. In the first step, lignin solution was prepared by mixing of 500 g of kraft lignin (solid content 95%), 961 g of water, 30.6 g of formalin (concentration 52.5%) and 194 g of 50% sodium hydroxide solution in a 5 liter glass reactor equipped with overhead stirrer, condenser and temperature control unit. Lignin solution was heated to 80° C. and continued heating at 80° C. for one hour. Then, the temperature of the lignin solution was decreased to 45° C.

In the second step, 484.8 g of phenol, 785.3 g of formalin (concentration 52.5%), 30 g of water and 52 g of 50% sodium hydroxide solution were added to the lignin solution. The temperature was increased to 80° C. and 185 g of 50% sodium hydroxide solution was added to the reaction mixture after 110 minutes of reaction. The reaction mixture was continuously heated at the temperature at 80° C. for further 130 minutes and then cooled down to room temperature. The reaction was monitored by measuring the viscosity using the Brookfield DV-II+LV viscometer.

The gel time of the resin was measured by adding 10 g of the resin in a glass tube with a stamper made of aluminium. The glass tube was heated at 100° C. in an oil bath. The stamper was moving up and down until the resin became gel. The time until the resin became gel was measured as gel time.

The resin was analyzed and the results of the analysis are given in Table 1.

TABLE 1

| Resin Properties | |
| --- | --- |
| S.C (%) | 45.4 |
| pH | 11.8 |
| Gel time (min) @100° C. | 50 |

Example 2

Lignin based phenolic resin was synthesized for plywood applications. In the first step, lignin solution was prepared by mixing of 500 g of kraft lignin (solid content 95%), 961 g of water, 73 g of formalin (concentration 52.5%) and 194 g of 50% sodium hydroxide solution in a 5 liter glass reactor equipped with overhead stirrer, condenser and temperature control unit. Lignin solution was heated to 80° C. and continued heating at 80° C. for one hour. Then, the temperature of the lignin solution was decreased to 45° C.

In the second step, 484.8 g of phenol, 743 g of formalin (concentration 52.5%), 30 g of water and 52 g of 50% sodium hydroxide solution were added to the lignin solution. The temperature was increased to 80 ° C. and 185 g of 50% sodium hydroxide solution was added to the reaction mixture after 90 minutes. The reaction mixture was continuously heated at the temperature at 80° C. for further 110 minutes and then cooled down to room temperature. The reaction was monitored by measuring the viscosity using the Brookfield DV-II+LV viscometer.

The resin was analyzed and the results of the analysis are given in Table 2.

TABLE 2

| Resin Properties | |
|---|---|
| S.C (%) | 45.7 |
| pH | 11.6 |
| Gel time (min) @100° C. | 49 |

Example 3

Lignin based phenolic resin was synthesized for plywood applications. In the first step, lignin solution was prepared by mixing of 167 g of kraft lignin (solid content 95%), 315 g of water, 24.3 g of formalin (concentration 52.5%) and 82 g of 50% sodium hydroxide solution in a 1 liter glass reactor equipped with overhead stirrer, condenser and temperature control unit. Lignin solution was heated to 60° C. and continued heating at 60° C. for one hour. Then, the temperature of the lignin solution was decreased to 45° C.

In the second step, 161 g of phenol, 248 g of formalin (concentration 52.5%) and 10 g of water were added to the lignin solution. The temperature was increased to 80° C. and 62 g of 50% sodium hydroxide solution was added to the reaction mixture after 90 minutes. The reaction mixture was continuously heated at the temperature at 80° C. for further 120 minutes and then cooled down to room temperature. The reaction was monitored by measuring the viscosity using the Brookfield DV-II+LV viscometer.

The resin was analyzed and the results of the analysis are given in Table 3.

TABLE 3

| Resin Properties | |
|---|---|
| S.C (%) | 46.8 |
| pH | 11.3 |
| Gel time (min) @100° C. | 48 |

Example 4

Lignin based phenolic resin was synthesized for laminate applications. In the first step, lignin solution was prepared by mixing of 117 g of kraft lignin (solid content 95%), 215 g of water, 5.7 g of formalin (concentration 52.5%) and 26.1 g of 50% sodium hydroxide solution in a 1 liter glass reactor equipped with overhead stirrer, condenser and temperature control unit. Lignin solution was heated to 80° C. and continued heating at 80° C. for one hour. Then, the temperature of the lignin solution was decreased to 45° C.

In the second step, 342 g of phenol and 310 g of formalin (concentration 52.5%) were added to the lignin solution. The temperature was increased to 90° C. The reaction mixture was continuously heated at the temperature at 90° C. for 110 minutes and then cooled down to room temperature. The reaction was monitored by measuring the viscosity using the Brookfield DV-II+LV viscometer.

The resin was analyzed and the results of the analysis are given in Table 4.

TABLE 4

| Resin Properties | |
|---|---|
| S.C (%) | 58 |
| pH | 8.8 |
| Gel time (min) @100° C. | 60 |

In view of the above detailed description of the present invention, other modifications and variations will become apparent to those skilled in the art. However, it should be apparent that such other modifications and variations may be effected without departing from the spirit and scope of the invention.

The invention claimed is:

1. A method for dissolving lignin in an aqueous medium comprising the steps of
   a) isolating lignin, and/or purifying the lignin;
   b) mixing the lignin, alkali and formaldehyde in an aqueous medium;
   c) mixing until a solution of the lignin in the aqueous medium has been obtained;
   wherein the molar ratio between the formaldehyde and lignin monomer is in a range of from 0.01 to 0.2.

2. A method according to claim 1, wherein the lignin has been isolated from black liquor.

3. A method according to claim 1, wherein the alkali is sodium hydroxide, potassium hydroxide, calcium hydroxide, magnesium hydroxide or a mixture thereof.

4. A method according to claim 1, wherein the molar ratio between the formaldehyde and lignin is in the range of from 0.01 to 0.15.

5. A method according to claim 1, wherein the molar ratio between the formaldehyde and lignin is in the range of from 0.01 to 0.10.

6. A method according to claim 1, wherein the solution in step c) comprises 5-50 wt % lignin.

7. A method according to claim 1, wherein the mixing in step c) is carried out at a temperature in a range of from 15° C. to 25° C. or from 25° C. to 95° C.

* * * * *